United States Patent
Cellier et al.

(10) Patent No.: US 8,854,535 B2
(45) Date of Patent: Oct. 7, 2014

(54) IMAGING DEVICE WITH AMBIENT LIGHT SENSORS

(75) Inventors: Alexandre Cellier, Le Versoud (FR); Benoit Deschamps, Sassenage (FR); Jeff Raynor, Edinburgh (GB)

(73) Assignees: STMicroelectronics (Research & Development) Limited, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 40 days.

(21) Appl. No.: 13/342,793

(22) Filed: Jan. 3, 2012

(65) Prior Publication Data
US 2012/0176533 A1    Jul. 12, 2012

(30) Foreign Application Priority Data
Jan. 3, 2011 (EP) ..................................... 11290002

(51) Int. Cl.
*H04N 5/235* (2006.01)
*G03B 7/099* (2014.01)
*G01J 1/42* (2006.01)

(52) U.S. Cl.
CPC ............. *H04N 5/2351* (2013.01); *G01J 1/4204* (2013.01); *G03B 7/09925* (2013.01)
USPC ....................................................... 348/362

(58) Field of Classification Search
None
See application file for complete search history.

(56) References Cited

U.S. PATENT DOCUMENTS

| | | | |
|---|---|---|---|
| 5,122,827 A | | 6/1992 | Saegusa et al. |
| 5,771,408 A | * | 6/1998 | Mizukawa ...................... 396/65 |
| 7,071,456 B2 | * | 7/2006 | Poplin ..................... 250/214 AL |
| 7,711,259 B2 | * | 5/2010 | Daley .............................. 396/89 |
| 2003/0093805 A1 | * | 5/2003 | Gin ............................... 725/105 |
| 2005/0218303 A1 | | 10/2005 | Poplin |
| 2009/0040308 A1 | * | 2/2009 | Temovskiy ................... 348/158 |
| 2012/0019713 A1 | * | 1/2012 | Gudlavalleti et al. ......... 348/366 |
| 2012/0092541 A1 | * | 4/2012 | Tuulos et al. ............ 348/333.01 |
| 2012/0148216 A1 | * | 6/2012 | Pavagada et al. ............. 386/278 |

FOREIGN PATENT DOCUMENTS

EP    1133168 A2    9/2001

* cited by examiner

*Primary Examiner* — Luong T Nguyen
(74) *Attorney, Agent, or Firm* — Seed IP Law Group PLLC

(57) ABSTRACT

An imaging device includes a fixed focus lens, an image sensor having an image matrix of a plurality of pixels arranged on a semiconductor substrate and supplying image data, and an electronic circuit for reading the image matrix. The image sensor also includes at least two ambient light sensors arranged on the semiconductor substrate on opposite sides of the image matrix, and configured to capture an ambient light intensity through the fixed lens, and the electronic circuit is also configured to read the two ambient light sensors and to supply ambient light data and the image data.

23 Claims, 2 Drawing Sheets

IMAGING DEVICE WITH AMBIENT LIGHT SENSORS

BACKGROUND

1. Technical Field

The present disclosure relates to an imaging device comprising a fixed focused lens and an image sensor comprising a plurality of pixels arranged on a semiconductor substrate and supplying image data and electronic means for reading the image matrix.

2. Description of the Related Art

Imaging devices typically comprise a lens and an image sensor in the form of a semiconductor chip comprising a matrix of pixels. These devices may be used for a wide range of applications including "machine vision" such as visual inspection of merchandise or facial recognition wherein an image is captured and processed. The device may further include an ambient light sensor ("ALS") functionality, for example to process a captured image depending on the amount of ambient light present, or to adjust a display intensity on a television monitor. Currently, such devices are being integrated into many devices including mobile telephones, personal digital assistants (PDAs), personal computers, music players, televisions, automobiles, etc.

It is known to use the matrix of pixels to perform both ambient light sensing and image capture functions. To sense the ambient light, the lens is unfocused so that the pixels may receive ambient light from as wide a view as possible. The lens is then re-focused for the image capture. Ambient light sensing and image capture are therefore done sequentially. Such a process is slow and not applicable when the lens cannot be focused and unfocused, which concerns many low-cost imaging devices.

BRIEF SUMMARY

One embodiment of the present disclosure is a low-cost imaging device with a fixed focus lens that can perform both ambient light sensing and image capture functions.

Some embodiments of the disclosure relate to an imaging device comprising a fixed focused lens, an image sensor comprising a image matrix comprising a plurality of pixels arranged on a semiconductor substrate and supplying image data, and electronic means for reading the image matrix, wherein the image sensor also comprises at least two ambient light sensors arranged on the semiconductor substrate on opposite sides of the image matrix, and configured to capture an ambient light intensity through the fixed lens, and the electronic means is also configured to read the two ambient light sensors and to supply ambient light data and the image data.

According to one embodiment, each ambient light sensor comprises a plurality of pixels, the pixels being arranged in at least one row and N columns.

According to one embodiment, each ambient light sensor has the same number of columns as the image matrix.

According to one embodiment, the device further comprises a processing unit configured to receive and process the ambient light data and the image data.

According to one embodiment, the processing unit is configured to process the ambient light data according to at least one of the following methods: $F1(Li)=AVG\ (D2, D3)$; $F2(Li)=MAX\ (D2, D3)$; $F3(Li)=MIN\ (D2, D3)$; $F4(Li)=(D2*C2+D3*C3)$; if $Fk<Tlow$, then $Fk(Li)=Tlow$; if $Fk>Thigh$, then $Fk(Li)=Thigh$; otherwise, then $Fk(Li)=Fk$; if $fk\{tn-1\}-fk\{tn\}<Tlow$ or if $fk\{tn-1\}-fk\{tn\}>Thigh$, then $F(hysteresis)\ (Li,tn)=Fk\{tn\}$, otherwise $F(hysteresis)=Fk\{tn-1\}$; wherein Li is the total number of pixels from the ambient light sensors, D2 and D3 are the ambient light data, AVG is the average function, MAX is a maximum function, MIN is a minimum function, C2 is a first weight coefficient, C3 is a second weight coefficient, k is one of F1, F2, F3, F4, Tlow is a pre-determined low threshold value, Thigh is a pre-determined high threshold value, tn−1 is a previous time, and to is a current time.

According to one embodiment, the electronic means uses the ambient light data supplied from each ambient light sensor to determine the orientation of the image sensor.

According to one embodiment, the device further comprises orientation detection means for determining the orientation of the device, the detection means supplying an orientation data.

Some embodiments of the disclosure also relate to a method for detecting an ambient light, comprising the steps of: providing a device according to one of the embodiments described above, reading ambient light data from each of the at least two ambient light sensors, and calculating an ambient light data from at least one of the ambient light data.

BRIEF DESCRIPTION OF THE SEVERAL VIEWS OF THE DRAWINGS

Embodiments of the present disclosure will now be described in connection with, but not limited to, the appended drawings in which.

DETAILED DESCRIPTION

Figure 1:
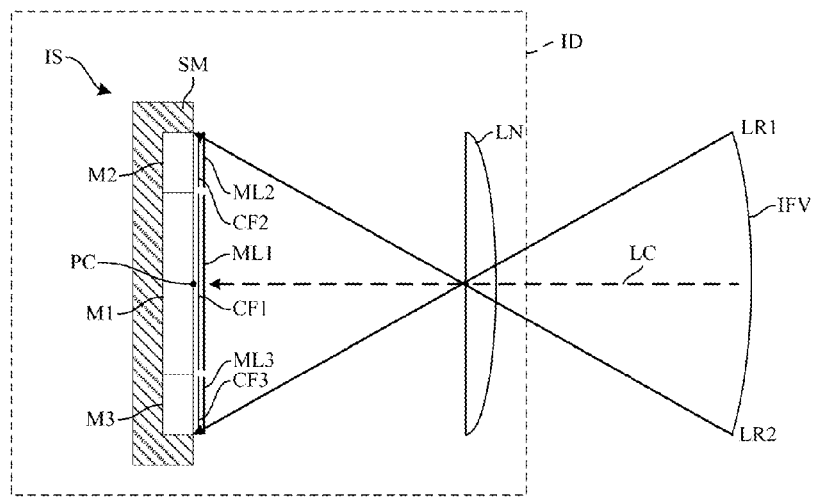
FIG. 1 schematically shows an imaging device comprising an image sensor according to the disclosure.
Figure 2:
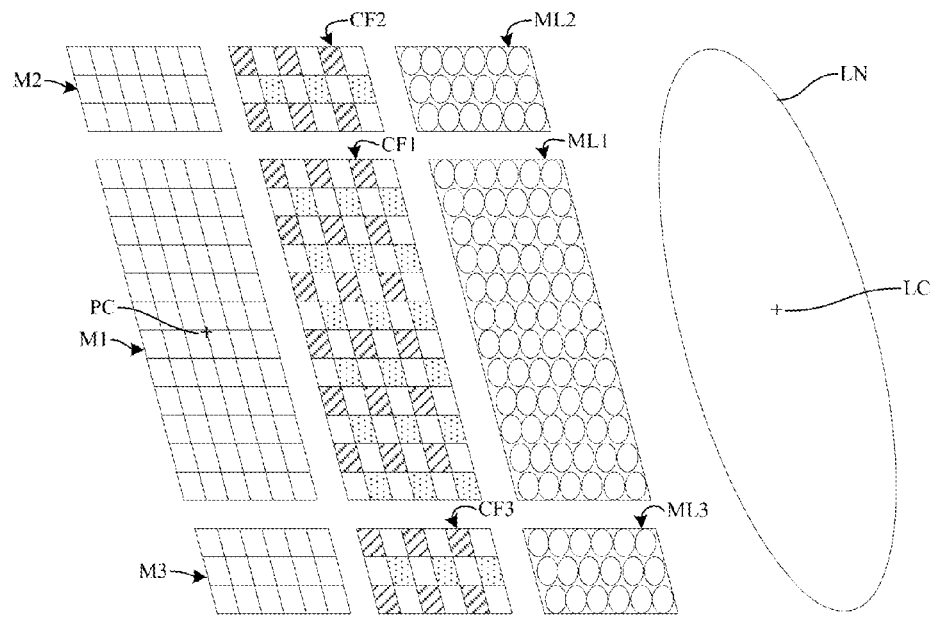
FIG. 2 shows an expanded view of the imaging device according to the disclosure.

FIG. 1 schematically shows an embodiment of an imaging device ID according to the disclosure, and FIG. 2 is an exploded schematic view of the imaging device ID.

The imaging device ID comprises a fixed focus lens LN and an image sensor IS on a semiconductor substrate SM. The image sensor IS comprises an image matrix M1 as well as electronic means (not shown) such as control, read, and processing circuitry. The lens LN has a central optical axis LC and is arranged so that the optical axis LC coincides with an optical center PC of the image matrix M1.

The image sensor IS also comprises first and second ambient light sensors M2, M3. The ambient light sensors M2, M3 are arranged on opposite sides of the image matrix M1 with respect to the optical center PC of the image matrix M1. The image matrix M1 and the ambient light sensors M2, M3 are covered by arrays of filters CF1, CF2, CF3, respectively, and the filters are covered by arrays of microlenses ML1, ML2, ML3, respectively.

FIG. 1 schematically shows an image field of view IFV of the imaging device and two light rays LR1, LR2 at the extremes of the field of view. The light rays are focused by the lens LN onto the image sensor IS. The arrangement of the two ambient light sensors M2, M3 allows approximately the entire image field of view to be sensed, each ambient light sensor M2, M3 covering approximately half of the field of view.

FIG. 2 shows in more detail the image matrix M1, the color filters CF1, CF2, CF3, the microlenses ML1, ML2, ML3, and the lens LN. The image matrix M1 comprises a plurality of pixels arranged in rows and columns. Each ambient light sensor M2, M3 may comprise at least one pixel, such as a "monopixel". In a preferred embodiment shown in FIG. 2, each ambient light sensor M2, M3 comprises a plurality of pixels with the same number of columns as the image matrix M1. For example, if the image matrix M1 comprises 600*200 (row*column) pixels, each ambient light sensor M2, M3 may comprise 8*200 pixels, i.e. 8 rows of 200 pixels each. Each pixel therefore has an address or identifier comprising a row reference and a column reference, and further comprises a photosensitive material.

The color filters CF1 may filter the incident light according to a determined pattern, such as the Bayer matrix wherein filters of a row are alternately red and green, or alternately blue and green. The arrays of color filters CF2, CF3 may have a different structure than color filters CF1, according to the wavelength of the ambient light to be sensed. The microlenses ML1, ML2, ML3 focus the incoming light rays onto the individual pixels. The fixed focus lens LN is arranged above the microlenses ML1, ML2, ML3.

Figure 3:
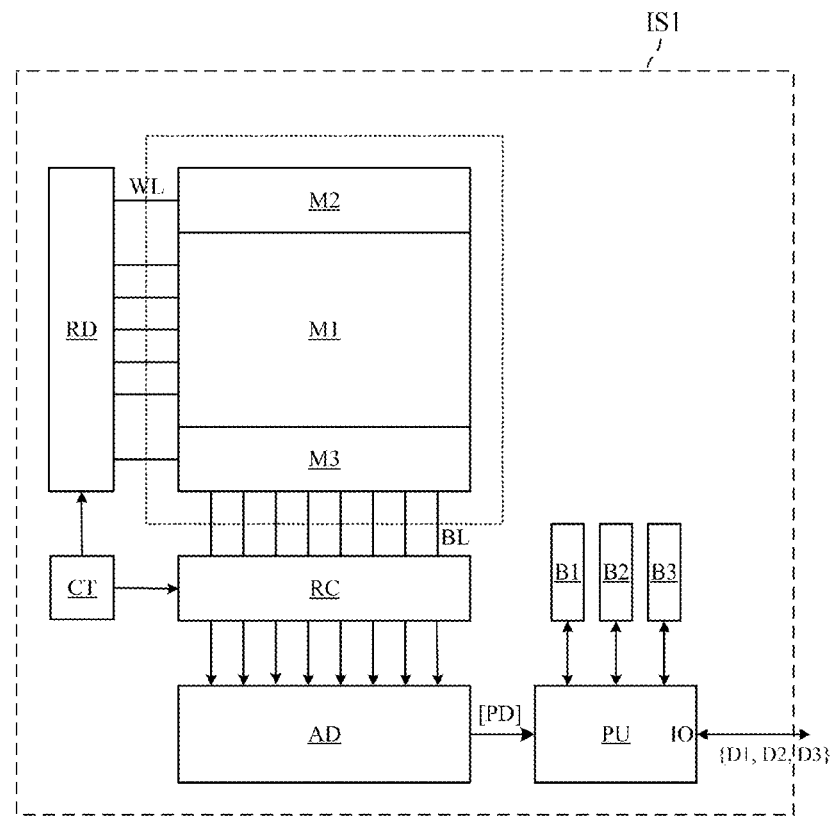
FIG. 3 shows an image sensor according to a first embodiment of the disclosure.

FIG. 3 schematically shows, in further detail, an image sensor IS1 according to a first embodiment of the disclosure.

The image sensor IS1 comprises the image matrix M1, the two ambient light sensors M2, M3, a row decoder RD, a read circuit RC, a control circuit CT to control the row decoder RD and the read circuit RC, an analog to digital converter AD, a processing unit PU, three data buffers B1, B2, B3 coupled to the processing unit PU, and an input/output port IO to supply image data D1 and ambient light data or values to an external processing device. All pixels of a row are connected to the row decoder RD via a word line WL, and all pixels of a column are connected to the read circuit RC via a bit line BL.

The capture of an image and ambient light sensing is performed row by row, and comprises an exposition phase and a read phase. The image sensor IS is exposed to incident light rays, which are focused onto individual pixels. Photons of the light rays cause electron-hole pairs to be generated in the photosensitive material of the pixel. The electrons charge a capacitive node of the pixel at a rate depending upon the light intensity of the incident light.

The pixels of a row are read sequentially, one column after the other, or may be read in parallel, wherein all columns are read at once. The control circuit CT thus commands the row decoder RD to activate a word line. The value of each pixel is transmitted to its corresponding bit line, and the read circuit RC receives the light intensity value measured by each pixel of the word line. The row decoder RD then activates the next word line and the process repeats until all pixels of all rows have been read.

Once the light intensity values stored in the pixels of a row have been read, they are erased automatically (destructive read-out). Once a pixel has been erased it may again be exposed. According to one embodiment, the exposure and read of the matrix M1 and the ambient light sensors M2, M3 is done in continuation. That is to say, once a pixel has been read, it begins to accumulate a charge so that once the last row of ambient light sensor M3 has been read, the read process repeats at the first row of the ambient light sensor M2. The amount of time between two successive reads of a pixel is therefore the amount of time required to read all the rows.

The read circuit RC supplies the light intensity values to the analog to digital converter AD. The converter AD converts the light intensity values into digital pixel data [PD], containing the address of the pixel and its light intensity value. This pixel data [PD] is then transmitted to the processing unit PU.

The processing unit PU therefore receives the pixel data [PD] and may store this data in the data buffers B1, B2, B3, each buffer corresponding to one of the matrices, M1, M2, M3. Once the pixel data has been acquired, it may be processed by the processing unit PU. In particular, the pixel data from image matrix M1 may be processed as image data D1. The pixel data from ambient light sensor M2 may be processed as an ambient light data D2, and the pixel data from ambient light sensor M3 may be processed as an ambient light data D3. These data D1, D2, D3 may then be supplied to the exterior via the port IO. Examples of data processing methods will be described later.

In this embodiment of the disclosure, the device does not comprise orientation detecting means. The device may be designed to be primarily oriented in a fixed manner, for example a television that is set on a stand. In this case, the light source is usually at the top of the field of view, such as a ceiling lamp, and the imaging device ID may optimize the computation of the ambient light data by selecting the ambient light sensor M2 or M3 closest to the light source. Alternatively, it may compare the data D2, D3 detected by each light sensor M2, M3 and determine the location of the light source, for example by whichever value is greater.

In one embodiment, the image sensor IS1 does not comprise the buffers B1, B2, B3 and the processing of the image data D1 and the ambient light data D2, D3 is done by an external processor, the processing unit PU merely outputting the data D1, D2, D3 through the port IO.

Figure 4:
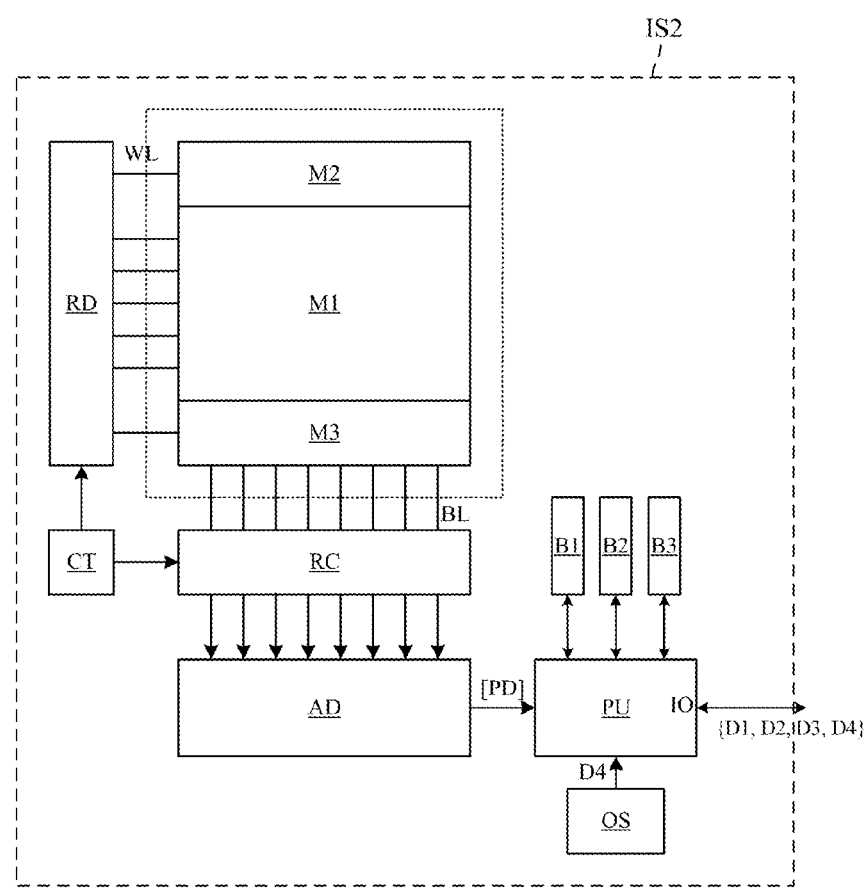
FIG. 4 shows an image sensor according to a second embodiment of the disclosure.

FIG. 4 schematically shows an image sensor IS2 according to a second embodiment of the disclosure. The image sensor IS2 comprises, in addition to the elements described above in relation with FIG. 3, an orientation sensor OS. The orientation sensor OS supplies a orientation data D4 to the processing unit PU. The orientation sensor may be a MEMS (Micro-Electro Mechanical) sensor.

In this embodiment, the processing unit PU uses orientation data D4 to process the data D2, D3 received from the ambient light sensors M2, M3. For example, if the device is rotated 180°, the ambient light sensor M3 is activated while ambient light sensor M2 is de-activated. If the device is rotated 90° or 270°, the data D2, D3 from sensors M2, M3 may be averaged. Data D4 may also be supplied to the exterior via the port IO.

The following data processing methods may be implemented by the processing unit PU to process the ambient light data D2, D3 supplied by the ambient light sensors M2, M3:

$$Fk(Li) = AVG(D2, D3) \quad \{\text{method 1}\}$$

$$Fk(Li) = MAX(D2, D3) \quad \{\text{method 2}\}$$

$$Fk(Li) = MIN(D2, D3) \quad \{\text{method 3}\}$$

$$Fk(Li) = (D2*C2 + D3*C3) \quad \{\text{method 4}\}$$

wherein Fk(Li) is an ambient light result, k is the data processing method reference (from 1 to 4), Li is the total number of pixels from the ambient light sensors, C2 is a first weight coefficient, and C3 is a second weight coefficient.

Method 1 is the average of the data D2, D3 from the ambient light matrices M2, M3; method 2 is the maximum of the data D2, D3; method 3 is the minimum of the data D2, D3; and method 4 is a weighted sum of the data D2, D3.

These data processing methods may be adjusted as desired. For example, if the device has a fixed orientation, only the data from one ambient light sensor M2 or M3 may be used, or the data from each ambient light sensor may be weighted, depending upon the application. For example, for applications oriented in a manner (such as a television set), it may be considered that most of the ambient light will come from one direction, and the weighting coefficients C2, C3 may be set accordingly, such as 0.2 and 0.8.

In other embodiments, the optimization may be adjusted automatically. For example, if data D3 is consistently larger than data D2, the algorithm is weighted to favor data D3 from sensor M3. Furthermore, if one ambient light sensor is not working as well as the other, its data may be ignored or given a low weight.

The results obtained according to the above methods (average, maximum, minimum, or weighted) may be compared to low threshold value Tlow and/or a high threshold value Thigh to determine whether the ambient light sensors M2, M3 are receiving less or more ambient light than pre-determined threshold values.

if $Fk<Tlow$, then $Fk(Li)=Tlow$ if $Fk>Thigh$, then $Fk(Li)=Thigh$ otherwise, then $Fk(Li)=Fk$ In this case, if the result of the data processing method (one of methods 1 to 4 above) is less than the low threshold, the result is set to the low threshold value. Likewise, if the result of the data processing method is greater than the high threshold, the result is set to the high threshold value. Otherwise, the function result remains as is.

Furthermore, a hysteresis function may be performed to smooth the variations of the ambient light data. For example, the results of one of the above methods (1 to 4) are obtained for a time tn−1 and then the results of the same method are obtained for a time tn. This difference may be compared to the low threshold Tlow, and to the high threshold Thigh.

if $fk\{tn-1\}-fk\{tn\}<Tlow$ or if $fk\{tn-1\}-fk\{tn\}>Thigh$ then $F(hysteresis)(Li,tn)=Fk\{tn\}$ otherwise $F(hysteresis)=Fk\{tn-1\}$ Therefore, if the difference between the result of FK(Li) at time tn−1 and time tn is less than the low threshold Tlow or greater than the high threshold Thigh, then the result is set to that at time tn. Otherwise the result is set to that at time tn−1.

In some embodiments, more than two ambient light sensors may be provided. For example, an ambient light sensor may be provided on each side of the image matrix M1.

In some embodiments, the application may determine whether only ambient light sensor M2 is used, only ambient light sensor M3 is used, or both ambient light matrices M2 and M3 are used.

In some embodiments, the ambient light matrices M2, M3 may be used to perform a pre-setting of image treatment. For example, the ambient light matrices may detect that there is not enough ambient light, and the user is instructed to perform an action.

In some embodiments, a first row decoder and first read circuit may be provided for the image matrix M1, and a second row decoder and second read circuit may be provided for the ambient light sensors M2, M3. Alternatively, matrix M1, and sensors M2, M3 may each comprise its own row decoder and read circuit.

The processing unit PU and/or the analog to digital converter AD may be located on the same support as the image matrix M1 and the ambient light sensors M2, M3, or may be on a different support. One or more amplifiers may also be included in order to amplify the light intensity values obtained from the pixels. If the image sensor is of the Active Pixel Sensor type, each pixel may comprise an amplifier to amplify its value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An imaging device comprising, comprising:
a fixed focus lens;
an image sensor that includes:
an image matrix on a semiconductor substrate, the image matrix including a plurality of pixels arranged in rows and columns;
first and second ambient light sensors arranged on opposite sides of the image matrix to capture an ambient light intensity through the fixed focus lens, each ambient light sensor including a plurality of pixels arranged in at least one row and N columns; and
a reading circuit coupled to the image matrix and the first and second ambient light sensors to select and read the first and second ambient light sensors and the image matrix, and to supply ambient light data with image data; and
a processing unit to process both the ambient light data and the image data and to generate an ambient light data result based on at least one of the following:
an average of ambient light data from the first ambient light sensor and ambient light data from the second ambient light sensor;
a maximum of the ambient light data from the first ambient light sensor and the ambient light data from the second ambient light sensor;
a minimum of the ambient light data from the first ambient light sensor and the ambient light data from the second ambient light sensor; and
a sum of a weighted value of the ambient light data from the first ambient light sensor and a weighted value of the ambient light data from the second ambient light sensor.

2. An imaging device according to claim 1, wherein each ambient light sensor has the same number of columns as the image matrix.

3. An imaging device according to claim 1, further comprising an orientation detector to detect an orientation of the image sensor and supply orientation data.

4. An imaging device according to claim 1, wherein the reading circuit selects and reads the first and second ambient light sensors and the image matrix in a single image capture and ambient light sensing cycle that includes reading first ambient light data from the first ambient light sensor, reading the image data from the image matrix, then reading second ambient light data from the second ambient light sensor.

5. A method for performing an image capture and ambient light sensing cycle using an imaging device that includes a semiconductor image matrix and first and second ambient light sensors arranged on opposite sides of the semiconductor image matrix, the method comprising:

performing a single image capture and ambient light sensing cycle that includes:
  sensing ambient light through a fixed focus lens;
  reading first ambient light data from the first ambient light sensor;
  reading image data from the semiconductor image matrix after reading ambient light data from the first ambient light sensor; and
  reading second ambient light data from the second ambient light sensor after reading the image data from the semiconductor image matrix: and
analyzing the first and second ambient light data from the first and second ambient light sensors;
determining, based on the analyzing, which of the first and second ambient light sensors is closest to a light source; and
computing an ambient light value based on the determining.

6. A method for performing an image capture and ambient light sensing cycle using an imaging device that includes a semiconductor image matrix and first and second ambient light sensors arranged on opposite sides of the semiconductor image matrix, the method comprising:
  performing a single image capture and ambient light sensing cycle that includes:
    sensing ambient light through a fixed focus lens;
    reading first ambient light data from the first ambient light sensor;
    reading image data from the semiconductor image matrix after reading ambient light data from the first ambient light sensor; and
    reading second ambient light data from the second ambient light sensor after reading the image data from the semiconductor image matrix; and
  comparing the first and second ambient light data to each other; and
  determining a location of a light source based on the comparing.

7. A method according to claim 5, comprising:
  analyzing the first and second ambient light data from the first and second ambient light sensors; and
  ignoring or giving one of the first and second ambient light data a low weight based on the analyzing.

8. A method for performing an image capture and ambient light sensing cycle using an imaging device that includes a semiconductor image matrix and first and second ambient light sensors arranged on opposite sides of the semiconductor image matrix, the method comprising:
  performing a single image capture and ambient light sensing cycle that includes:
    sensing ambient light through a fixed focus lens;
    reading first ambient light data from the first ambient light sensor;
    reading image data from the semiconductor image matrix after reading ambient light data from the first ambient light sensor; and
    reading second ambient light data from the second ambient light sensor after reading the image data from the semiconductor image matrix; and
  determining an ambient light result based on at least one of the following:
    an average of the first and second ambient light data;
    a maximum of the first ambient light data and the second ambient light data;
    a minimum of the first ambient light data and the second ambient light data; and
    a sum of a weighted value of the first ambient light data and a weighted value of the second ambient light data.

9. A method according to claim 5, comprising:
  supplying orientation data from an orientation sensor of the imaging device; and
  using the orientation data to process the ambient light data and image data.

10. An imaging device comprising:
  a lens; and
  an image sensor that includes:
    an image matrix on a semiconductor substrate, the image matrix including a plurality of pixels arranged in rows and columns;
    first and second ambient light sensors arranged on opposite sides of the image matrix to capture an ambient light intensity through the lens;
    a reading circuit coupled to the image matrix and the first and second ambient light sensors to select and read the first and second ambient light sensors and the image matrix, and to supply ambient light data with image data, wherein the reading circuit selects and reads the first and second ambient light sensors and the image matrix in a single image capture and ambient light sensing cycle that includes reading ambient light data from the first ambient light sensor, reading image data from the image matrix, then reading ambient light data from the second ambient light sensor; and
  a processing unit to process both the ambient light data and the image data and to determine an ambient light result based on at least one of the following:
    an average of ambient light data read from the first ambient light sensor and ambient light data read from the second, ambient light sensor;
    a maximum of the ambient light data read from the first ambient light sensor and the ambient light data read from the second ambient light sensor;
    a minimum of the ambient light data read from the first ambient light sensor and the ambient light data read from the second ambient light sensor; and
    a sum of a weighted value of the ambient light data read from the first ambient light sensor and a weighted value of the ambient light data read from the second ambient light sensor.

11. An imaging device according to claim 10, wherein each ambient light sensor has the same number of columns as the image matrix.

12. An imaging device according to claim 10, wherein the image sensor includes an orientation detector to detect an orientation of the image sensor and supply orientation data.

13. A method for performing an image capture and ambient light sensing cycle using an imaging device that includes a semiconductor image matrix and first and second ambient light sensors arranged on opposite sides of the semiconductor image matrix, the method comprising:
  performing a single image capture and ambient light sensing cycle that includes:
    reading first ambient light data from the first ambient light sensor;
    reading image data from the semiconductor image matrix after reading the first ambient light data from the first ambient light sensor; and
    reading second ambient light data from the second ambient light sensor after reading the image data from the semiconductor image matrix; and determining an ambient light result based on at least one of:
an average of the first ambient light data and the second ambient light data;
a maximum of the first ambient light data and the second ambient light data;
a minimum of the first ambient light data and the second ambient light data; and
a sum of a weighted value of the first ambient light data and a weighted value of the second ambient light data.

14. A method according to claim 13, comprising:
comparing the first and second ambient light data to each other; and
determining a location of a light source based on the comparing.

15. A method for performing an image capture and ambient light sensing cycle using an imaging device that includes a semiconductor image matrix and first and second ambient light sensors arranged on opposite sides of the semiconductor image matrix, the method comprising:
a single image capture and ambient light sensing cycle that includes:
reading first ambient light data from the first ambient light sensor;
reading image data from the semiconductor image matrix after reading the first ambient light data from the first ambient light sensor; and
reading second ambient light data from the second ambient light sensor after reading the image data from the semiconductor image matrix;
supplying orientation data from an orientation sensor of the imaging device;
using the orientation data to process the first and second ambient light data and image data;
comparing the first and second ambient light data to each other; and
determining a location of a light source based on the comparing.

16. An imaging device comprising:
a lens; and
an image sensor that includes:
an image matrix on a semiconductor substrate, the image matrix including a plurality of pixels arranged in rows and columns;
first and second ambient light sensors arranged on opposite sides of the image matrix to capture an ambient light intensity through the lens;
a reading circuit coupled to the image matrix and the first and second ambient light sensors to select and read the first and second ambient light sensors and the image matrix, and to supply first and second ambient light data with image data; and
a processing unit to process both the first and second ambient light data and the image data, wherein the processing unit determines an ambient light value based on at least one of the following:
an average of the first ambient light data and the second ambient light data;
a maximum of the first ambient light data and the second ambient light data;
a minimum of the first ambient light data and the second ambient light data;
and
a sum of a weighted value of the first ambient light data and a weighted value of the second ambient light data.

17. The imaging device of claim 1 wherein the processing unit
compares the ambient light data result to a first threshold value and a second threshold value, the second threshold value being higher than the first threshold value;
if the ambient light data result is lower than the first threshold value, sets the ambient light data result to the first threshold value; and
if the ambient light data result is higher than the second threshold value, sets the ambient light data result to the second threshold value.

18. The imaging device of claim 1 wherein the processing unit
compares a difference between a current ambient light data result and a previous ambient light data result to a first threshold value and a second threshold value, the second threshold value being higher than the first threshold value; and
if the difference is higher than the first threshold value and lower than the second threshold value, sets the current ambient light data result to the previous ambient light data result.

19. The imaging device of claim 17 wherein the processing unit
compares a difference between a current ambient light data result and a previous ambient light data result to a first hysteresis threshold value and a second hysteresis threshold value, the second hysteresis threshold value being higher than the first hysteresis threshold value;
if the difference is higher than the first hysteresis threshold value and lower than the second hysteresis threshold value, sets the current ambient light data result to the previous ambient light data result.

20. The method of claim 8, comprising:
comparing the ambient light result to a first threshold value and a second threshold value, the second threshold value being higher than the first threshold value;
if the ambient light result is lower than the first threshold value, setting the ambient light result to the first threshold value; and
if the ambient light result is higher than the second threshold value, setting the ambient light result to the second threshold value.

21. The method of claim 8, comprising:
comparing a difference between a current ambient light data result and a previous ambient light data result to a first threshold value and a second threshold value, the second threshold value being higher than the first threshold value; and
if the difference is higher than the first threshold value and lower than the second threshold value, setting the current ambient light data result to the previous ambient light data result.

22. The method according to claim 6, comprising:
supplying orientation data from an orientation sensor of the imaging device; and
using the orientation data to process the ambient light data and image data.

23. The method of claim 6, comprising:
comparing the ambient light result to a first threshold value and a second threshold value, the second threshold value being higher than the first threshold value;
if the ambient light result is lower than the first threshold value, setting the ambient light result to the first threshold value; and
if the ambient light result is higher than the second threshold value, setting the ambient light result to the second threshold value.

* * * * *